United States Patent [19]

Tovi

[11] E Re. 29,735

[45] Reissued Aug. 15, 1978

[54] ROTATIONAL LIGHTING SYSTEM

[75] Inventor: Murray Tovi, New York, N.Y.

[73] Assignee: Murray Tovi Designs, Inc., New York, N.Y.

[21] Appl. No.: 683,773

[22] Filed: May 6, 1976

Related U.S. Patent Documents

Reissue of:

[64] Patent No.: 3,924,119
Issued: Dec. 2, 1975
Appl. No.: 496,191
Filed: Aug. 9, 1975

[51] Int. Cl.[2] ..... F21V 21/20

[52] U.S. Cl. ..... 362/401; 248/364

[58] Field of Search ..... 240/52 R, 78 R, 73 R, 240/49, 10.1, 1.4; 248/331, 364

[56] References Cited

U.S. PATENT DOCUMENTS

| | | | |
|---|---|---|---|
| 2,609,484 | 9/1952 | Benard | 240/52 R |
| 3,312,434 | 4/1967 | Simon | 248/364 X |
| 3,576,988 | 5/1971 | Henning | 240/52 R |
| 3,751,654 | 8/1973 | Grebinar | 240/52 R |

*Primary Examiner*—Richard L. Moses
*Attorney, Agent, or Firm*—Fleit & Jacobson

[57] ABSTRACT

A remotely controlled rotational lighting system for illuminating any chosen area of a room. A first motor is mounted on the ceiling at the approximate center of the area to be illuminated. A main support arm extends from the shaft of the motor and lies in a substantially horizontal plane. A second motor is suspended at one extremity of the main support arm and mates with a fixture support arm. A cluster of lighting elements is mounted at one extremity of the fixture support arm, while a set of counterweights is mounted at the other extremity. The end of the main support arm remote from the fixture support arm is provided with a set of counterweights so that the main support arm is in substantially perfect balance at its point of association with the ceiling-mounted motor.

16 Claims, 5 Drawing Figures

ROTATIONAL LIGHTING SYSTEM

Matter enclosed in heavy brackets [ ] appears in the original patent but forms no part of this reissue specification; matter printed in italics indicates the additions made by reissue.

BACKGROUND OF THE INVENTION

In many rooms, it is desirable to have the capability of illuminating discreet areas and creating different moods at distinct times of the day. Also desirable is the capability of so reaching all areas of a room with a remotely controlled lighting system. There is no known, single-element lighting system in the lighting industry which has these capabilities.

In Swiss Pat. No. 64,577, there is disclosed a lighting element comprised of two movable arms. Each arm is counterbalanced and is adapted to pivot about a horizontal axis. Though such a lighting element is capable of being mounted on a ceiling and pivoted from one position to another, it fails to satisfy the needs noted above.

Another lighting array is disclosed in U.S. Pat. No. 3,751,654. This patent discloses a lighting array adapted for mounting on a ceiling and operable in a substantially horizontal plane. Furthermore, this array is capable of illuminating a relatively large area of a room. However, such a lighting array serves more as a sculpture than a useful lighting element; it is adapted to be moved by air currents, rather than by motors. In addition, such a lighting array lacks the capacity of illuminating all areas of a room.

The present invention is directed toward the design of a remotely controlled, reliable and efficient, horizontally rotable lighting array which is capable of illuminating substantially every area of a given room.

SUMMARY OF THE INVENTION

The present invention relates to a remotely controlled lighting array which is designed for use in a substantially horizontal plane. The array comprises a lighting element mounted at one end of an elongated support member which, in turn, is suspended in perfect balance on another elongated support member. The latter support member is itself mounted in perfect balance, by counterweights, on the shaft of a ceiling-mounted motor. The two elongated supporting members are connected to one another by another motor. Each of the motors is remotely controlled at a central control panel on a wall or other convenient location to the operator.

The reliability and efficiency of the inventive lighting system is ensured by the perfect balance developed at the rotating shafts of the respective motors. As a result of this perfect balance, strain on the motors is minimized, as is the energy required to develop rotation of the lighting array. To further ensure minimum stress on the respective motors, the elongated support arms are joined together through a stress-relieving connecting element.

The inventive lighting system is designed in such a manner that the distance between the lighting cluster and its center of rotation is substantially equal to the distance between the ceiling-mounted motor and the juncture of the two support arms. In this manner, the lighting cluster can be made to hover over any location in the room within a circle having a radius equal to twice the distance between the lighting cluster and its associated motor. The lighting cluster can also hover at a location substantially directly under the ceiling-mounted motor.

It is accordingly the main object of the present invention to develop a remotely controlled lighting system which is capable of hovering over substantially any area of a given room.

A further object of the present invention is to provide a lighting system which is mounted for rotation in a substantially horizontal plane, and which is capable of being remotely controlled in a reliable and efficient manner.

Yet a further object of the present invention is to provide a rotationally mounted lighting system which is substantially perfectly balanced to avoid stress on its operating motors and which can be adjusted in a substantially effortless manner.

These and other objects of the present invention, as well as many of the attendant advantages thereof, will become more readily apparent when reference is made to the following description taken in conjunction with the accompanying drawings.

DETAILED DESCRIPTION OF THE DRAWINGS

Figure 1:
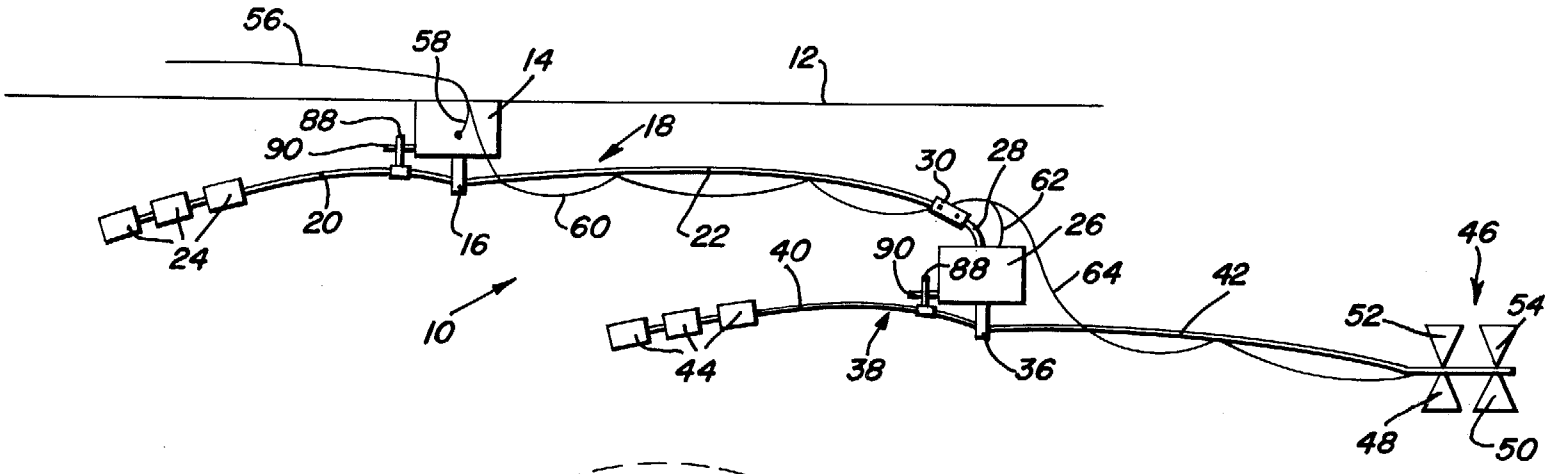
FIG. 1 is a side elevation of the inventive lighting system, in its fully extended position.

With reference first to FIG. 1, the basic configuration of the inventive lighting system will be described. The lighting system is shown generally at 10, mounted on a ceiling designated 12. The system 10 is held on the ceiling through a motor 14 equipped with a rotational shaft 16 extending therefrom. A main elongated support arm 18 extends from the motor shaft 16 and lies in a substantially horizontal plane. In the preferred embodiment, the support arm 18 is comprised of two sections, arm 20 and arm 22, respectively. As illustrated in FIG. 1, the arm 20 mates with the shaft 16 at a 75° angle, while arm 22 defines an angle of 72° with the shaft 16. The respective shafts 20 and 22 are so designed and connected to the shaft of motor 14 to enable bending thereof due to the weight of the equipment.

Figure 2:
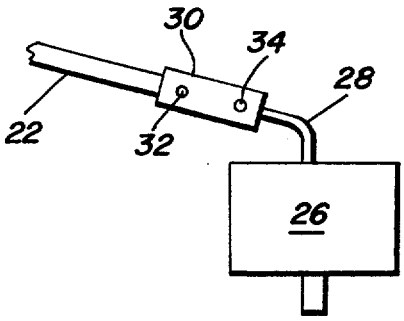
FIG. 2 is an enlarged view of one mechanism by which a motor is mounted to prevent strain thereon.

At the end of arm 20 remote from the motor 14 are positioned three counterweight elements 24. A motor 26 associates with the end of arm 22 remote from the motor 14. As illustrated in FIGS. 1 and 2, motor 26 is connected to the arm 22 through a thin, flexible stainless steel rod 28 and a brass sheath 30. Pins 32 and 34 fix the arm 22 and the flexible connecting member 28 to the sheath 30.

A rotable motor shaft 36 extends from the motor 26 and serves as a base for a fixture support arm 38. Like arm 18, support arm 38 is constructed of two elements, namely arms 40 and 42, respective.y. A set of three counterweights 44 is mounted at the end of arm 40 remote from the motor 26, while a cluster of lights shown generally at 46 is mounted at the end of arm 42 remote from the motor 26. The lighting cluster 46 comprises two lighting elements 48 and 50 extending downwardly toward the floor of the room, and two lighting elements 52 and 54 extending upwardly toward the ceiling 12.

A main electrical control line 56 is illustrated as extending above the level of ceiling 12 and entering the casing of motor 14. One set of wires 58 couples into the motor 14, which is preferably a small, reversible, hysteresis motor operable at approximately one revolution per minute. The remaining electrical leads are indicated at 60 and extend toward the motor 26 at which location a set of control leads 62 enters the motor casing. The remaining conductors 64 continue into the lighting cluster 46. While each of the lighting elements can be individually controlled, it is contemplated that lighting elements 48 and 50 be operated together, contemplated that lighting elements 52 and 54 also be operated together.

Figure 3:
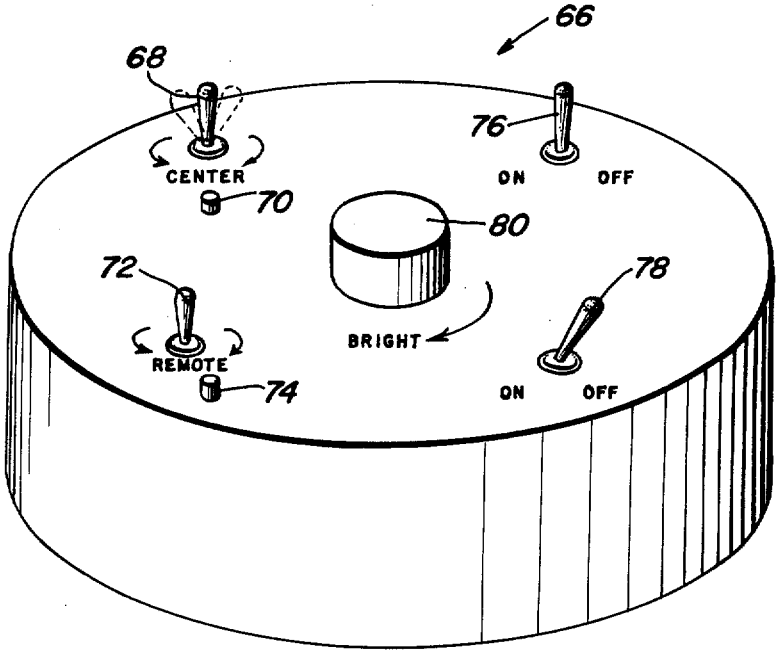
FIG. 3 is a perspective view of a control panel for operating the inventive lighting system.

The main electrical control line 56 is connected to power through a control panel indicated generally at 66 in FIG 3. Control panel 66 comprises five control elements. A two-way center-biased toggle switch 68 controls the operation of the ceiling-mounted motor 14. In one position of the switch 68, indicated in phantom, the motor 14 turns the main support arm 18 in a clockwise direction. In the other position of switch 68, also shown in phantom, the motor turns the arm 18 in a counterclockwise direction. The switch 68 is biased into the position shown in solid lines, at which position the motor 14 is idle. An indicator lamp shown at 70 becomes active when the motor 14 is being operated. A toggle switch 72, identical to switch 68, serves to operate the motor 26, and associates with an indicator lamp 74 identical to lamp 70.

A two-position toggle switch 76 serves as an on-off switch for the lighting elements 48 and 50. A similar switch 78 controls the on-off operation of lighting elements 52 and 54. Finally, a dimmer control 80 serves to vary the intensity of the lighting elements which are active. It should be noted that all of the lighting elements 48 through 54 can be operated together.

Figure 4:
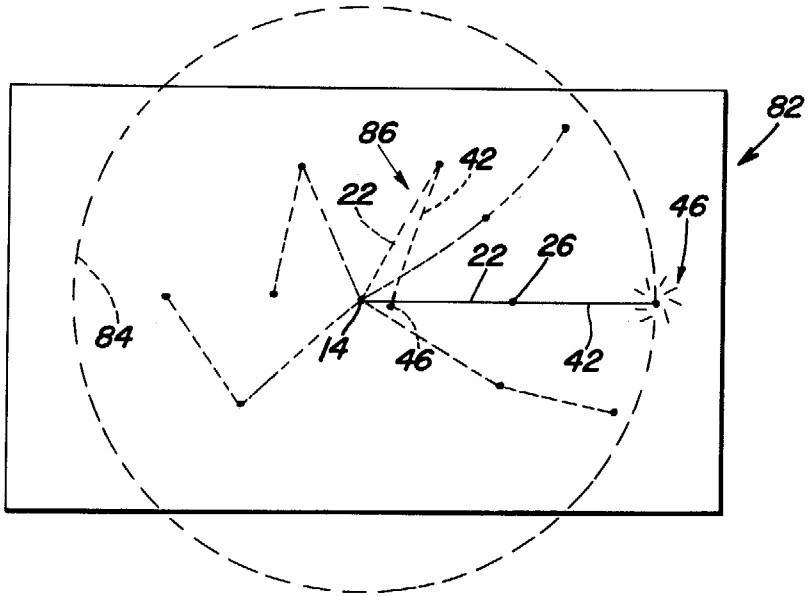
FIG. 4 is a schematic representation of the range and versatility enjoyed by the inventive lighting system.

With reference now to FIG. 4, the versatility of the inventive lighting system will be described.

In FIG. 4, there is illustrated a long and narrow room, designated generally at 82. Also schematically illustrated in FIG. 4 is the motor 14, arm 22, motor 26, arm 42 and lighting cluster 46. The lighting system illustrated in solid lines is in its fully extended position.

As should be evident from FIG. 4, the range of the inventive lighting system is defined by a circle 84 having its center at the position of the motor 14, and having a radius equal to the combined lengths of arms 22 and 42. Since arms 22 and 42 are substantially equal in length, the radius of circle 84 can be thought of as being twice the length of either of the arms. It can be seen that circle 84 encompasses substantially the entire room 82.

Several orientations of the lighting system 10 within circle 84 are illustrated in FIG. 4. For example, as illustrated in phantom and designated generally at 86, there is an orientation of the lighting system 10 in which the lighting cluster 46 lies substantially at the center of circle 84. Other possible orientations are shown in phantom. With such a lighting system as that described above, it should be evident that substantially any location of a typical room can be illuminated. The lighting array may be centered for reflective illumination off the ceiling, brought over a dinner table, sofa, reading chair, etc. The only constraints are that the length of arm 22 cannot exceed one-half the width of room 82, and, in order that the lighting array 46 may be positioned as indicated at 86 in FIG. 4, arm 42 should be substantially equal in length to arm 22.

It can be seen in FIG. 4 that when the lighting system 10 is in the position illustrated generally at 86, the lighting cluster 46 is not precisely centered beneath motor 14. The reason for this can be understood with reference again to FIG. 1. On each of arms 20 and 40, is mounted a pin 88 projecting upwardly in the direction of the associated motor 14 or 26. A mating stop 90 is mounted on each of the motors 14 and 26, and coacts with the respective pins 88 on arms 20 and 40. In this manner, the full swing of each support arm 18 and 38 is limited to sightly less than a full 360°. Complicated slip rings can therefore be avoided without endangering the integrity of the electrical wiring.

Figure 5:
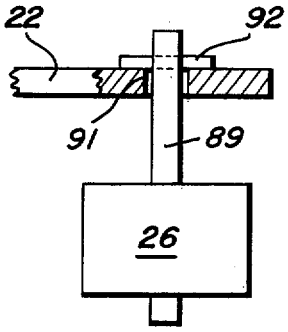
FIG. 5 is a view similar to that illustrated in FIG. 2, but showing an alternate strain relief mechanism.

With reference now to FIG. 5, an alternate configuration for the self-leveling motor mount will be described. As illustrated, the motor 26 is equipped with a vertically extending support post 89 extending therefrom. A vertically extending bore or aperture 91 is placed at the extremity of support arm 22 and serves as a passage in which post 89 is housed. The inside diameter of aperture 91 is larger than the outside diameter of post 89, so that post 89 takes a loose fit in its mating passage 91. The upper portion of post 89 is also apertured, and holds a pin 92 which serves as a bearing surface on which the motor 26 and its associated mechanisms are carried. The loose fit of the post 89 within the aperture 91 enable the motor 26 to freely hang by gravity. The counterweights 44 (FIG. 1) are positioned so that the motor shaft 36 is suspended substantially vertically.

A lighting system embodying the features of the present invention has been constructed and operated. Each of the arms 22 and 42 takes the form of a 6 foot solid stainless steel pole. Each of the arms 20 and 40 is constructed of similar stainless steel, but arm 20 being 4 ½ feet in length and arm 40 being 1 ½ feet in length. As noted above, arms 20 and 22, 40 and 42 take a small angle relative to their respective mating shafts 16 and 36. In addition, each of the motors 14 and 26 has been equipped with a safety mechanical clutch to allow relatively free movement of the motor mechanism in the event that the lighting array strikes a wall of the room. The lighting elements 52 and 54 were designed as 150 watt incandescent bulbs, with element 48 being an amber spotlight and element 50 being a flood lamp. Also, support arm 18 is of a larger diameter than support arm 38 since arm 18 must carry a greater load. In addition, though the specific embodiment of the invention described above and constructed has been adapted for mounting on the ceiling, it should be appreciated that a wall or floor mount unit can be constructed without departing from the spirit or scope of the invention.

One further aspect of the invention is deemed worthy of specific mention. This feature is directed to the mechanism by which the main support arm 18 is balanced on its associated motor shaft 16. The balancing of support arm 38 has already been described when reference was made to FIGS. 2 and 5.

In the embodiment of the invention which has been constructed and operated, the motor shaft 16 is trimmed in a limited region along its length so as to define a region of a relatively small diameter. This region is located intermediate the motor mechanism and the area of attachment for the support arm 18, and is designed to flex to a limited degree. In this manner, imbalance of the arm 18 can be tolerated without stressing the motor mechanism. Balance is accomplished by moving the counterweights 24, until arm 18 is substantially horizontal. Then, a sleeve is moved over the small diameter region of the motor shaft and is clamped in place. The sleeve serves to rigidify the motor shaft after balancing is completed.

The present invention has been described for purposes of illustration, by way of specific embodiments. It should be appreciated that the invention is not intended to be so limited, but can be altered and modified in numerous ways which will become evident to those skilled in the art. It is therefore the intention that the present invention be limited only as defined in the appended claims. What is claimed is:

1. A horizontal, remotely controlled lighting system in which a source of illumination can hover over substantially any given region of an area to be illuminated, the lighting system comprising: a first motor element adapted to be fixedly mounted relative to the area to be illuminated, said first motor element having a first rotable motor shaft; a first elongated support arm having first and second ends, said first support arm being mounted on said first motor shaft intermediate its first and second ends, for rotation with said first motor shaft, and in a substantially horizontal plane; a second motor element suspended from the first end of said first support arm, said second motor element having a second rotatable motor shaft; a second elongated support arm having first and second ends, said second support arm being mounted on said second motor shaft intermediate its first and second ends, for rotation with said second motor shaft, and in a substantially horizontal plane; lighting means mounted at the first end of said second support shaft; counterweight means mounted at the second end of said second support arm, weighted and positioned so that said second support arm, said counterweight means and said lighting means are in substantial horizontal balance about said second motor shaft; second counterweight means mounted at the second end of said first support arm, weighted and positioned so that said first support arm, carrying the associated second motor element, second support arm, second counterweight means and lighting means, is in substantial horizontal balance about said first motor shaft; and control means for independently controlling the operation of said first and second motor elements and thereby the respective rotatable motor shafts, and said lighting means; and wherein the distance between the first end of said first support arm and the first motor shaft is substantially equal to the distance between the first end of said second support arm and said second motor shaft.

2. The lighting system recited in claim 1, and further comprising; a flexible support element intermediate said second motor element and the first end of said first support arm, for suspending said second motor shaft in a substantially vertical orientation.

3. The lighting system recited in claim 1, and further cmprising: a vertical post rigidly extending upwardly from said second motor element; an aperture in the first end of said first support arm through which said vertical post extends; a pin for maintaining said vertical post in said aperture; and wherein the outside diameter of said vertical post is less than the inside diameter of said aperture.

4. The lighting system as recited in claim 1, wherein said first and said second motor elements are equipped with clutch means for enabling the respective motor mechanisms to continue operation should the respective motor shafts become immobilized.

5. The lighting system recited in claim 1, wherein said first support arm is comprised of two sections extending substantially in a straight line from opposite sides of said first motor shaft; and wherein said second support arm is comprised of two sections extending substantially in a straight line from opposite sides of said second motor shaft.

6. The lighting system recited in claim 5, wherein the two sections of said first support arm and the two sections of said second support arm each extend from their respective motor shafts in a direction slightly upwardly from the horizontal, so that normal bowing in said first and second support arms can be tolerated in substantially horizontal planes.

7. The lighting system recited in claim 6, wherein one section of said first support arm associates with said counterweight means; wherein the other section of said first support arm associates with said second motor element; wherein one section of said second support arm associates with said second counterweight means; and wherein the other section of said second support arm associates with said lighting means.

8. The lighting system recited in claim 1, wherein the first and second motor elements and said lighting means are remotely controlled by means of a control panel comprising: a first two-position motor toggle switch, biased in an off position, for controlling the operation of said first motor element; a second two-position motor toggle switch, biased in an off position, for controlling the operation of said second motor element; at least one two-position toggle switch for controlling the operation of said lighting means; and a dimmer control for varying the intensity of the lighting means.

9. The lighting system recited in claim 8, wherein said first and second motor elements are reversible motors; and wherein said first and second motor toggle switches control the respective direction of motor operation.

10. The lighting system recited in claim 8, and further comprising: first and second indicator lamps for indicating the operation of said first and second motor elements.

11. The lighting system recited in claim 1, wherein said first and said second motor elements, in repose, form substantially friction-free hubs about which the respective first and second support arms can rotate.

12. The lighting system recited in claim 1, wherein the length of said first support arm is greater from the first motor element to the second motor element than from the first motor element to said counterweight means; and wherein the length of said second support arm is greater from the second motor element to the lighting means than from the second motor element to said second counterweight means.

13. The lighting system recited in claim 1, and further comprising: stop means to limit the rotation of each said first and said second motor shaft to less than 360°.

14. The lighting system recited in claim 13, wherein each of said stop means 13 comprises a first stop element mounted on one of said support arms and a second coacting stop element mounted on one of said motor elements.

*15. A horizontal, remotely controlled system in which a source of energy can hover over substantially any given region of an area, the system comprising: a first motor element adapted to be fixedly mounted relative to said*

*area, said first motor element having a first rotatable motor shaft; a first elongated support arm having first and second ends, said first support arm being mounted on said first motor shaft intermediate its first and second ends, for rotation with said first motor shaft, and in a substantially horizontal plane; a second motor element suspended from the first end of said first support arm, said second motor element having a second rotatable motor shaft; a second elongated support arm having first and second ends, said second support arm being mounted on said second motor shaft intermediate its first and second ends, for rotation with said second motor shaft, and in a substantially horizontal plane; energy means mounted at the first end of said second support shaft; counterweight means mounted at the second end of said second support arm, weighted and positioned so that said second support arm, said counterweight means and said energy means are in substantial horizontal balance about said second motor shaft; second counterweight means mounted at the second end of said first support arm, weighted and positioned so that said first support arm, carrying the associated second motor element, second support arm, second counterweight means and energy means, is in substantial horizontal balance about said first motor shaft; and control means for independently controlling the operation of said first and second motor elements and thereby the respective rotatable motor shafts, and said energy means; and wherein the distance between the first end of said first support arm and the first motor shaft is substantially equal to the distance between the first end of said second support arm and said second motor shaft.*

*16. A horizontal, movably controlled system in which a source of energy can hover over substantially any given region of an area, the system comprising: a first element adapted to be fixedly mounted relative to said area, said first element having a first rotatable shaft; a first elongated support arm having first and second ends, said first support arm being mounted on said first shaft intermediate its first and second ends, for rotation with said first shaft, and in a substantially horizontal plane; a second element suspended from the first end of said first support arm, said second element having a second rotatable shaft; a second elongated support arm having first and second ends, said second support arm being mounted on said second shaft intermediate its first and second ends, for rotation with said second shaft, and in a substantially horizontal plane; energy means mounted at the first end of said second support shaft; counterweight means mounted at the second end of said second support arm, weighted and positioned so that said second support arm, said counterweight means and said energy means are in substantial horizontal balance about said second shaft; second counterweight means mounted at the second end of said first support arm, weighted and positioned so that said first support arm, carrying the associated second element, second support arm, second counterweight means and energy means, is in substantial horizontal balance about said first shaft; and means for independently controlling the operation of said first and second elements and thereby the respective rotatable shafts, and said energy means; and wherein the distance between the first end of said first support arm and the first shaft is substantially equal to the distance between the first end of said second support arm and said second shaft.*

* * * * *